(12) United States Patent
Wang et al.

(10) Patent No.: US 7,380,088 B2
(45) Date of Patent: May 27, 2008

(54) STORAGE DEVICE METHOD AND APPARATUS

(75) Inventors: Yuanru Frank Wang, Broomfield, CO (US); Jim Mechalke, Weld, CO (US)

(73) Assignee: Dot Hill Systems Corp., Carlsbad, CA (US)

( * ) Notice: Subject to any disclaimer, the term of this patent is extended or adjusted under 35 U.S.C. 154(b) by 142 days.

(21) Appl. No.: 11/051,160

(22) Filed: Feb. 4, 2005

(65) Prior Publication Data

US 2006/0179209 A1 Aug. 10, 2006

(51) Int. Cl.
G06F 12/00 (2006.01)
G06F 1/26 (2006.01)

(52) U.S. Cl. .................... 711/170; 711/114; 711/171; 711/202; 713/320; 713/300

(58) Field of Classification Search ................ None
See application file for complete search history.

(56) References Cited

U.S. PATENT DOCUMENTS

| | | | |
|---|---|---|---|
| 5,271,012 A | 12/1993 | Blaum et al. | |
| 5,333,143 A | 7/1994 | Blaum et al. | |
| 5,351,246 A | 9/1994 | Blaum et al. | |
| 5,412,809 A | 5/1995 | Tam et al. | |
| 5,568,629 A * | 10/1996 | Gentry et al. | 711/114 |
| 5,579,475 A | 11/1996 | Blaum et al. | |
| 5,774,292 A | 6/1998 | Georgiou et al. | |
| 6,856,508 B2 | 2/2005 | Rabinovitz | |
| 6,938,181 B1 * | 8/2005 | Talagala et al. | 714/7 |
| 7,035,972 B2 * | 4/2006 | Guha et al. | 711/114 |
| 7,152,142 B1 * | 12/2006 | Guha et al. | 711/114 |
| 2002/0144057 A1 * | 10/2002 | Li et al. | 711/112 |
| 2002/0199129 A1 * | 12/2002 | Bohrer et al. | 714/7 |
| 2003/0046470 A1 | 3/2003 | Sivertsen | |
| 2003/0061440 A1 * | 3/2003 | Elliott | 711/114 |
| 2003/0081378 A1 | 5/2003 | Debbins et al. | |
| 2004/0064638 A1 * | 4/2004 | Chong, Jr. | 711/114 |
| 2004/0162957 A1 * | 8/2004 | Don et al. | 711/170 |
| 2005/0081086 A1 * | 4/2005 | Williams | 714/5 |
| 2005/0204207 A1 * | 9/2005 | Arai et al. | 714/54 |
| 2006/0036605 A1 * | 2/2006 | Powell et al. | 707/10 |
| 2006/0161823 A1 * | 7/2006 | Sato | 714/710 |

OTHER PUBLICATIONS

Varitas Volume Manager 3.1, Administrators's Guide, Jun. 2001. pp. 28-40.*
Sheppard, E., "Measuring the HBA's Role in SAN Management: An IDC White Paper," pp. 1-10 (2001).

(Continued)

*Primary Examiner*—Hyung S. Sough
*Assistant Examiner*—Kaushikkumar Patel
(74) *Attorney, Agent, or Firm*—Sheridan Ross P.C.

(57) ABSTRACT

The present invention provides for a data storage system having a number of virtual storage devices. Each of the virtual storage devices may include a number of physical storage devices. The physical storage devices need not be separately addressable by a host system. Each virtual storage device unit may comprise a field replaceable unit encompassing no more than a single virtual storage device. Physical storage devices included in a virtual storage device that are not in active use may be powered down, even while one or more other physical devices included in that virtual storage device are powered up.

21 Claims, 6 Drawing Sheets

OTHER PUBLICATIONS

Xyratex—Storage Systems—Storage Products, 4 pages, printed Feb. 4, 2005, available at http://www.xyratex.com/products/storage/storage_products.htm.

Cook, R., New FC-AL technology ushers in "SBOD," 3 pages, (Dec. 15, 2003) printed Feb. 4, 2005, available at http://searchstorage.techtarget.com/tip/1,289483,sid5_gci940923,00.html.

Dot Hill, SANnet II FC Fibre Channel SAN Solution, 2 pages, printed Jan. 4, 2005, available at http://www.dothill.com/products/sannet2_fc/htm.

Emulex Corporation—Newsroom, 3 pages, (2005) printed Feb. 4, 2005, available at http://www.emulex.com/products/white/fc/art_storage.html.

nStor Corporation, 1 page (2004), printed Jan. 4, 2005, available at http://ww.nstor.com/default.asp?bdy=/product/Storage.asp.

PCT International Searching Authority, International Search Report, Feb. 13, 2007, 4 pages.

PCT Written Opinion of the International Searching Authority, Feb. 13, 2007, 9 pages.

International Preliminary Report on Patentability for International (PCT) Patent Application No. PCT/US2005/045395, mailed Aug. 16, 2007, 10 pages.

* cited by examiner

STORAGE DEVICE METHOD AND APPARATUS

FIELD OF THE INVENTION

The present invention is directed to providing data storage. In particular, the present invention is directed to addressing serviceability and cooling problems typically associated with high density storage devices or systems.

BACKGROUND OF THE INVENTION

The need to store digital files, documents, pictures, images and other data continues to increase rapidly. As a result, the demand for data storage continues to increase. In addition, recent legislation, such as the Sarbanes-Oxley Act in the United States, affecting the management of electronic records, has increased the need for data storage. As the demand for data storage has increased, the space or volume occupied by storage systems has become an important issue. In particular, data storage having high capacity, high density, and space efficiency has become increasingly desirable.

In order to provide increased storage space, storage devices with ever greater storage capacities are being developed. However, the storage needs of even small enterprises can easily exceed the storage capacity of a single data storage device. In addition, in order to safeguard data, systems providing data redundancy that include multiple storage devices are necessary.

Systems that provide at least some integration of individual storage devices, such as JBOD (just a bunch of disks), SBOD (switched bunch of disks) or RAID (redundant array of independent (or inexpensive) disks) systems have been developed. Such systems are typically deployed within enclosures to present an integrated component to the user. The typical enclosure features very tight drive packaging, leaving little space for controllers if the system provides a RAID array, or an interface card if the system provides a JBOD or SBOD system. Furthermore, with the development of higher RPM (e.g., 10,000 RPM and 15,000 RPM) hard disk drives and reduced (e.g. 1 inch) drive packaging, the thermal densities of state of the art storage enclosures have increased. In addition, the dense packaging of multiple storage devices creates serviceability and/or cooling problems. For example, storage devices within an enclosure are commonly interconnected to trays or sleds that facilitate the insertion and removal of devices from the enclosure. For example, in connection with an enclosure adapted for use as part of a rack or stack of multiple enclosures or other devices, the sleds can be arranged so that they are removable through the front panel of the enclosure. Furthermore, the sled is typically implemented as a field replaceable unit (FRU) such that even relatively unsophisticated personnel can exchange failed components for replacements. That is, the sled and any attached disk drives are replaced as a unit, rather than removing a failed disk drive from the sled, and attaching a new disk drive to the sled. In order to maximize the storage density of a storage device enclosure, multiple disk drives would need to be interconnected to each sled. Accordingly, in connection with systems featuring more than one disk drive on a sled, the replacement of a failed disk drive typically results in the removal of a functional storage device. Furthermore, while most RAID arrays providing data redundancy can tolerate a single drive failure, data is lost or will be unavailable if more than a single data storage device is removed from a typical RAID array. Therefore, removing a sled to service one of a number of interconnected drives can result in the removal of data from the system. Accordingly, systems featuring multiple disk drives per sled present serviceability and maintenance problems.

The high packaging densities that can be achieved by interconnecting multiple disk drives to a sled, and by providing a number of such disk drives within an enclosure, also presents cooling problems. Although storage system enclosures typically include one or more cooling fans, maximum cooling capacity is eventually limited by the volume within the enclosure available for the passage of cooling air. This problem can be addressed by adopting more elaborate cooling techniques, such as liquid cooling. However, such alternatives to air cooling can dramatically increase the cost of the storage system.

In order to reduce the amount of power consumed by storage devices, systems that allow storage devices to be powered down have been developed. In a typical power saving system, a storage device is powered down if it has not been used to store or access data for a predetermined period of time. In general, such systems have been used in connection with battery powered computing devices in order to extend battery life. However, such techniques have generally not been adapted to data storage systems featuring a number of storage devices. In particular, such systems have typically used hard disk drive type storage devices in order to provide fast access to data. However, powering down a hard disk drive can dramatically increase access times, because a hard disk drive must be spun up before data can be accessed. In addition, such storage devices are typically line powered, and therefore power consumption is not a major concern. As a result, powering down disk drives has generally not been thought to be practical in connection with relatively high density storage systems.

In addition to storage systems that utilize a number of hard disk drive type storage devices, systems using other storage media have been developed. For example, systems using reels or cartridges of magnetic tape have long been used for storing large amounts of data. In addition to providing reels or cartridges that are always associated with a read/write head, tape libraries have been developed in which robotic actuators are used to retrieve tapes having desired information. Although tape based storage systems are generally characterized by much longer access times than disk type storage systems, the access times have been considered acceptable when tape based systems are used for "near line" applications, where near instantaneous access is not required. However, tape based storage systems have remained relatively expensive and can require a large amount of space. Accordingly, applications for tape based storage systems have generally been limited to large main frame computer systems. Furthermore, with the steady introduction of advances in the capacities of magnetic disk and optical disk type storage devices, and as the cost per megabyte of disk drives has gotten closer to that of tape based storage systems, tape based storage systems have become less desirable, particularly in view of the faster response times of disk based systems.

SUMMARY OF THE INVENTION

The present invention is directed to solving these and other problems and disadvantages of the prior art. In accordance with embodiments of the present invention, a storage system housed in an enclosure that receives a number of storage device sleds and in which multiple physical storage devices are interconnected to each sled is provided. For each sled, the interconnected storage devices are treated as a single virtual storage device, to present a field replaceable unit that includes one (and no more than one) virtual storage device. In accordance with further embodiments of the present invention, the physical storage devices on a sled are concatenated together. Accordingly, data is first stored to a first physical storage device and, after that first physical storage device is full, to the next physical storage device. In accordance with still other embodiments of the present invention, only those physical storage devices that are being actively accessed are powered on. For example, during typical operation, only one physical storage device per sled, and thus per virtual storage device, may be powered on.

In accordance with further embodiments of the present invention, a method for providing a data storage system is disclosed. According to such a method, multiple physical storage devices are concatenated together to form a single virtual storage device. According to further embodiments of the present invention, the replacement of a virtual storage device is effected by the removal of a single storage device sled containing multiple physical storage devices as a single unit. The replacement of a virtual storage device can comprise the insertion of a sled containing multiple physical storage devices. In accordance with further embodiments of the present invention, a physical storage device that does not comprise that portion of a virtual storage device from which data is being retrieved or to which data is being stored is placed in a standby or powered down mode to reduce power consumption and heat generation.

In accordance with embodiments of the present invention that concatenate physical storage devices on a sled to form one virtual storage device, a large number of physical storage devices can be placed within an enclosure, while maintaining serviceability and power consumption/heating requirements. In particular, by providing a number of physical storage devices that are each part of the same virtual storage device on the same sled, removal of that sled because of a failure with respect to one of the physical storage devices not result in the removal of a physical storage device associated with or comprising any other virtual storage device. Therefore, when a virtual storage device is deployed as one of the "disks" in a RAID array that provides for data redundancy if one disk is lost (e.g., RAID levels 1-5), the RAID array (i.e., the data storage system) can continue to operate normally while the virtual storage device containing multiple physical storage devices is removed. Furthermore, in connection with a RAID array that provides for data redundancy (e.g., RAID levels 1-6), a user can restore the data storage system to a fully operational status by replacing the removed virtual storage device with a new virtual storage device, and allowing the RAID array to rebuild the data that was stored on the failed virtual storage device onto the new virtual storage device. Because replacing the virtual storage device can be performed by inserting a new field replaceable unit comprising a sled and multiple physical storage devices, the replacement operation need not be performed by a skilled computer technician.

In addition, by concatenating the physical storage devices of a virtual storage device, only one of the physical storage devices needs to be maintained in a full operational mode to enable the physical storage device to immediately handle incoming write operations, or while write operations are in progress. In connection with read operations, the last accessed physical storage device may be maintained in a fully operational state, providing reduced access times if a next operation concerns that physical storage device. Alternatively, or after a predetermined period of time during which no physical storage devices of a virtual storage device have been involved in read/write operations, all of the physical storage devices can be placed in a powered down or standby mode. Therefore, a portion of the virtual storage device can be powered down, even while data is written to or retrieved from another portion of the virtual storage device, and all of the storage devices can be powered down during periods of inactivity. This then results in reduced power consumption and heat production as compared to storage systems providing a like amount of total storage capacity using a like number of physical storage devices. Embodiments of the present invention are particularly advantageous in sequential storage applications, such as applications involving the storage of very large files, and creating backup copies of large data sets, as reduced power consumption as compared to systems having a like number of storage devices is achieved, without substantially impacting access times. Embodiments of the present invention are also advantageous in connection with random access applications, such as database or online transaction processing (OLTP), that can tolerate relatively long access times to allow for storage devices comprising hard disk drives to spin-up.

In accordance with still other embodiments of the present invention, a physical storage device comprising a hard disk drive that has been powered down is periodically restarted. For example, when a physical storage device is powered down or placed in a standby mode, a timer may be started. At the expiration of a predetermined period of time, as indicated by the timer, the physical storage device may be powered up, even in the absence of a read/write request involving the physical storage device, in order to properly "exercise" the storage device.

Additional features and advantages of the present invention will become more readily apparent from the following description, particularly when taken together with the accompanying drawings.

DETAILED DESCRIPTION

The present invention is directed to providing a storage system for instructions or data, hereinafter referred to as a data storage system, comprising a number of virtual storage devices, at least some of which are made up of multiple physical storage devices. More particularly, the virtual storage devices may comprise multiple physical storage devices interconnected to a common sled that are concatenated together to form a single storage unit. The sled and attached physical storage devices, and thus the virtual storage device, may further comprise a field replaceable unit. One or more physical storage devices of a virtual storage device can be powered down, even while another physical storage device in the same virtual storage device is performing read/write operations. Embodiments of the present invention may additionally monitor the amount of time that a physical storage device has been powered off to ensure that the physical device storage is exercised appropriately.

Figure 1:
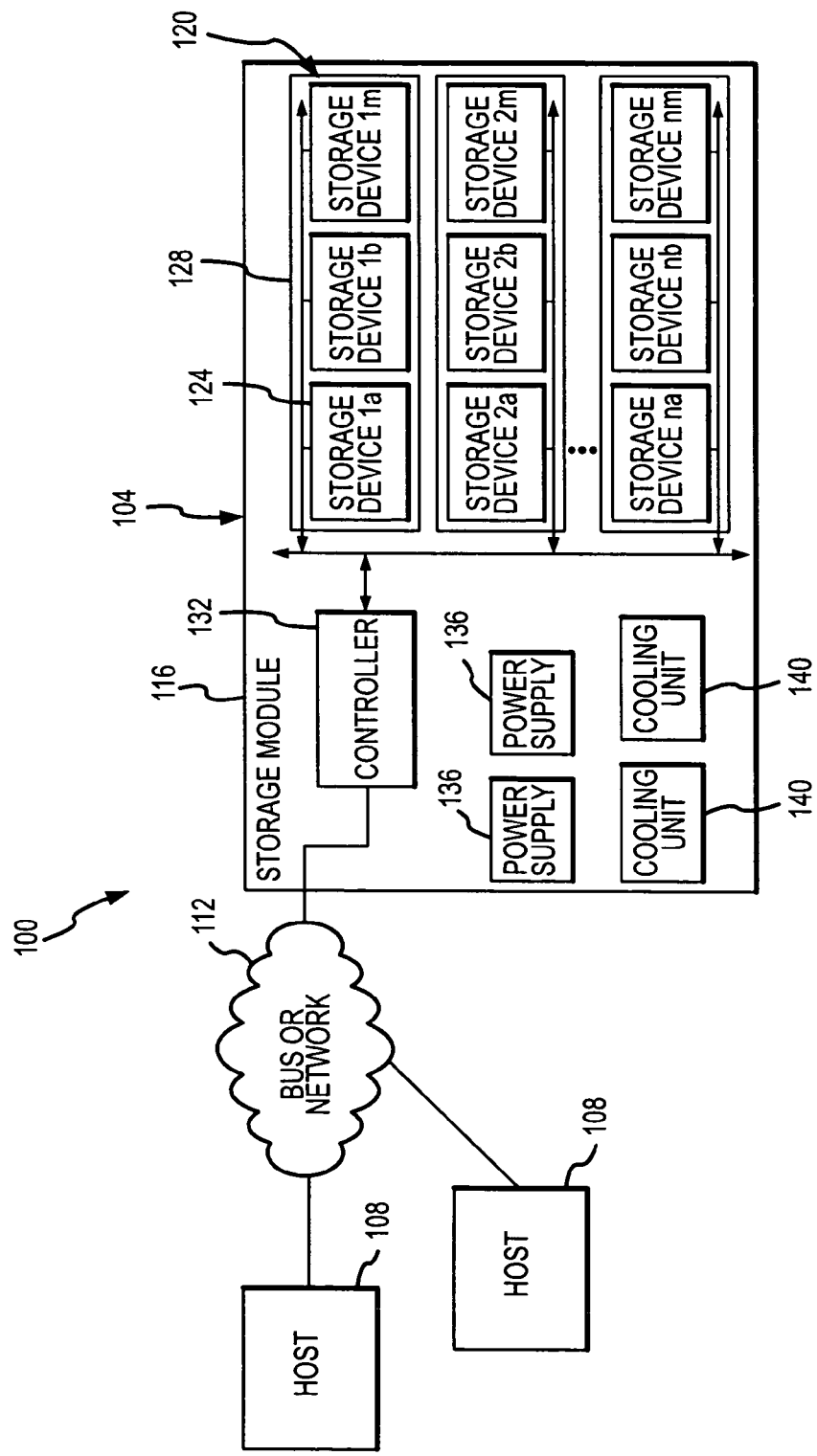
FIG. 1 is a block diagram of components of a storage system in accordance with embodiments of the present invention.

With reference now to FIG. 1, a computer system 100 incorporating a data storage system or module 104 in accordance with embodiments of the present invention is illustrated. In general, the computer system 100 includes the data storage system 104 and one or more host processors or computers 108 interconnected to the data storage system 104 by a bus and/or network 112. Accordingly, embodiments of the present invention have applications in association with single or multiple hosts 104 in storage area network (SAN) or direct connect environments.

The data storage system 104 may include an enclosure 116 housing at least some of the other components of the data storage system 104. In addition, the data storage system 104 may also include a number of virtual storage device units 120, also referred to herein as simply virtual storage devices 120. Each virtual storage device unit 120 includes a number of physical storage devices 124 interconnected to a storage device sled 128. The data storage system 104 may additionally include one or more controllers 132, one or more power supplies 136, and one or more cooling units 140.

In accordance with embodiments of the present invention, the enclosure 116 is dimensioned so that it is easily integrated into a conventional rack of computer devices, such as additional data storage systems 104 in accordance with embodiments of the present invention, other storage systems, servers, communications equipment, etc. Accordingly, as an example, the enclosure 116 may have a width of about 17½ inches and a depth of about 20½ inches, and may have a height of about 7 inches (i.e., it may be four standard rack units tall). The enclosure 116 may provide openings in a front panel to permit virtual storage device units 120, each comprising a storage device sled 128 and a number of interconnected storage devices 124, to be removed from the enclosure 116 as a single virtual storage device unit 120 comprising a field replaceable unit. However, different sizes of enclosure and configurations may be provided, for example in connection with different storage applications. For instances, where field serviceability is not a concern, the storage device units 120 need not be removable through the front panel of the enclosure when the enclosure is attached to a rack containing other storage systems or other related devices.

Each virtual storage device unit 120 provided as part of a data storage system 104 includes one or more physical storage devices 124 and a storage device sled 128, to which the storage devices 124 are interconnected. In addition, at least one of the virtual storage device units 120 includes multiple storage devices 124. Accordingly, a virtual storage device unit 120 may provide a total data storage capacity that is spread across multiple physical storage devices 124. In addition, by interconnecting each physical storage device 124 of a virtual storage device unit 120 to a common sled 128, replacement of one or more of the physical storage devices 124 of a virtual storage device 120 can be effected by removing the entire virtual storage device unit 120 from the enclosure 116 and data storage system 104. In addition, because embodiments of the present invention require that each storage device sled 128 contains physical storage devices 124 that are associated with no more than one virtual storage device 120, removing a single storage device sled 128 and attached physical storage devices 124 from a data storage system 104 affects only one virtual storage device 120. Therefore, for example, where each virtual storage device unit 120 within a data storage system 104 functions as a single "drive" within a RAID array providing redundancy in the event of a single drive failure, the data contained on the removed virtual storage device 120 can be rebuilt using conventional RAID processes once a replacement for the removed virtual storage device 120 has been installed in the data storage system 104.

The controller 132 generally functions to aggregate the physical storage devices 124 attached to a common sled 128 into a single virtual storage device 120. More particularly, the controller 132 may concatenate the physical storage devices 124 of each virtual storage device unit 120. Accordingly, a first physical storage device 124 may be treated as the first portion of a total storage volume provided by a single virtual storage device 120, and therefore be filled with data before data is written to any other physical storage device 124 included in the virtual storage device 120. This allows an operating system or external or higher level controller to address a virtual storage device 120 as a single storage device, without requiring any knowledge of the physical storage devices 124 that may comprise the virtual storage device 120. Although illustrated as a single controller 132 in FIG. 1, other embodiments are possible. For example, a controller 132 may be provided as part of each virtual storage device unit 120, for example mounted to the storage device sled 128 with the physical storage devices 124. In accordance with embodiments providing a controller 132 as part of each virtual storage device unit 120, a separate controller 132 may still be provided, for example to facilitate presentation of the data storage system 104 implementing a RAID array as a single storage device to external systems.

The controller 132 also generally functions to control the flow of data between the bus or network 112 and one or more of the virtual storage devices 120. Accordingly, the controller 132 may comprise a controller or adapter that allows the multiple physical storage devices 124 of any one virtual storage device unit 120 provided as part of the data storage system 104, or the entire data storage system 104, to appear as a single storage device to a host 108. Therefore, examples of a controller 132 include a RAID controller, implementing any one of various RAID schemes, a JBOD Oust a bunch of disks) system controller, an SBOD (switched bunch of disks) system controller, or a controller for any other storage system featuring a number of storage devices. However, such system level control functions do not need to be performed by a controller 132 provided as part of a data storage system 104. For example, a controller that implements a RAID array using virtual storage devices 120 provided as part of the data storage system 104 may be implemented as a separate controller, or as software, provided as part of or running on a host 108 or other computer or system, while one or more additional controllers 132 allow multiple physical storage devices 124 of a virtual storage device 120 to appear as a single storage device to the higher level controller or software.

The one or more power supplies 136 may be included to provide power in the format required by the other components of the data storage system 104. For example, a power supply 136 may convert 120 Volt line power to a 12 Volt direct current for supply to the storage devices 124, and a 3

Volt direct current for supply to the controller 132. Although a single power supply 136 is illustrated in FIG. 1, it can be appreciated that multiple power supplies 136 may be included in order to meet power requirements, or to provide redundancy.

The one or more cooling units 140 may be provided to help ensure that the nominal operating temperatures of storage devices 124 and other components within the enclosure 116 are not exceeded. In accordance with embodiments of the present invention, the cooling unit 140 comprises a fan or blower powered by an electric motor for moving air through the enclosure 116. Although shown as separate from the power supply 136, the cooling unit 140 may be integrated with the power supply 136. In addition, multiple cooling units 140 may be provided. Although an advantage of certain embodiments of the present invention is the avoidance of elaborate cooling technologies in order to maintain appropriate temperatures within an enclosure 116, a storage system 104 may include a cooling unit 140 that uses various cooling techniques, including systems that incorporate a liquid cooling medium.

Each physical storage device 124 may comprise a storage unit that is separately addressable by at least a controller 132 provided as part of the data storage system 104. As an example, the physical storage device 124 may comprise a hard disk drive, such as a serial advanced technology attachment (SATA) disk drive. Accordingly, it can be appreciated that embodiments of the present invention may utilize relatively inexpensive storage devices. Examples of other storage devices that may be used in connection with embodiments of the present invention include small computer systems interface (SCSI) and fiber channel (FC) hard disk drives. Embodiments of the present invention may also utilize storage devices 124 other than devices utilizing magnetic disks as a storage medium. For example, a storage device 124 may also include magnetic tape, optical storage devices or solid state disk devices.

A storage device sled 128 generally provides a structure that permits two or more physical storage devices 124 to be interconnected to the storage device sled 128, forming a virtual storage device unit 120 comprising a number of physical storage devices 124. Furthermore, the structure provided by the storage device sled 128 facilitates the removal and replacement of virtual storage devices 120 by allowing all of the components of a virtual storage device unit 120 to be removed from or placed in an enclosure 116 as a single unit. That is, each virtual storage device 120 may comprise a field replaceable unit.

In addition to providing a physical structure that permits the interconnection of multiple physical storage devices 124 to one another, and that permits the interconnection of the resulting virtual storage device 120 to an enclosure 116, a sled 128 may provide electrical signal and power channels. For example, a storage device sled 128 may include conductive traces for providing signal lines required by attached physical storage devices 124 and conductive traces for supplying power to those physical storage devices 124. The storage device sled 128 may additionally provide circuitry for performing various functions, such as implementing a controller 132 and/or for receiving additional components, such as a controller 132 integrated circuit or chip.

Figure 2:
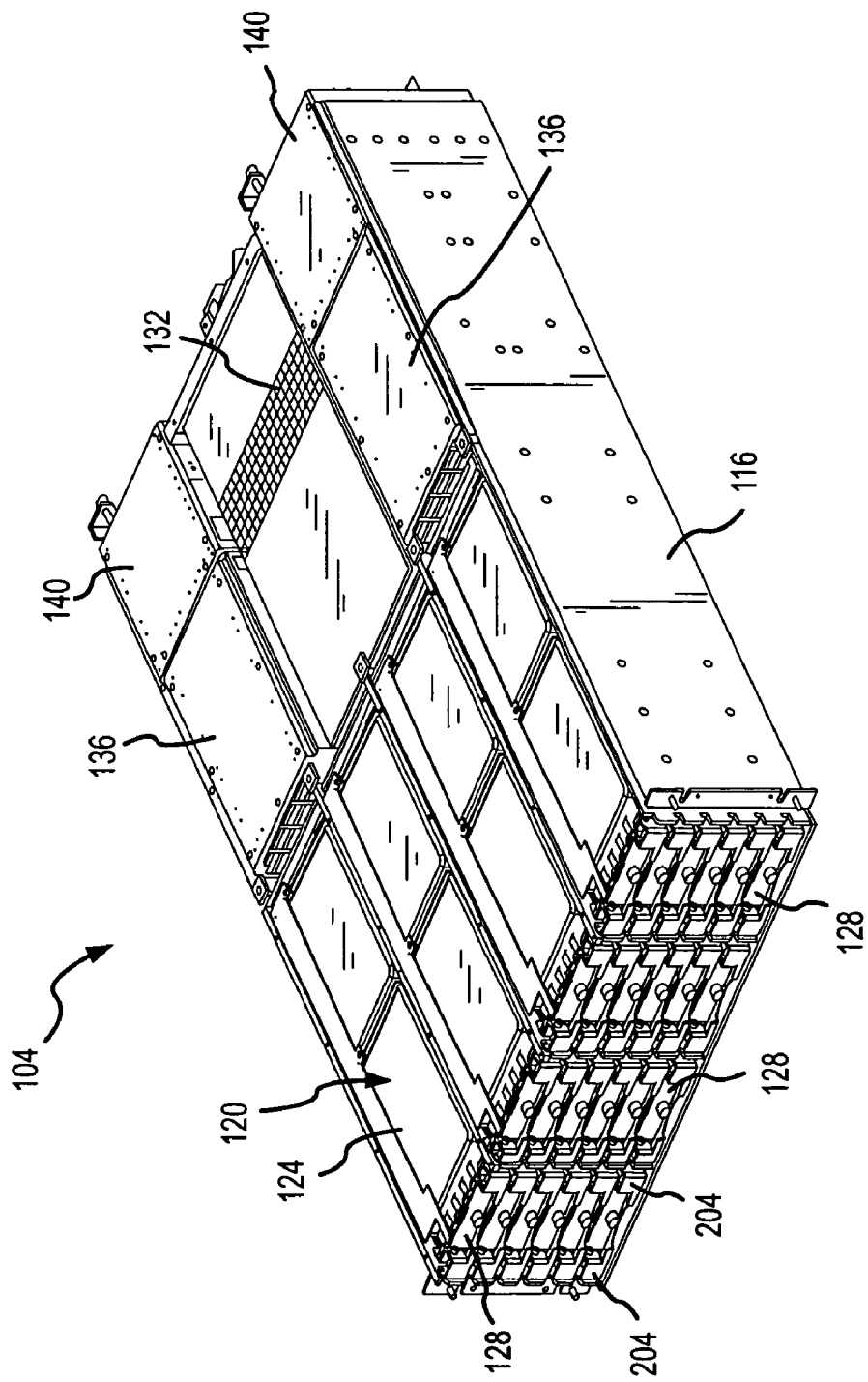
FIG. 2 is a perspective view of an exemplary data storage system module in accordance with embodiments of the present invention.

With reference now to FIG. 2, a data storage system 104, in accordance with embodiments of the present invention, is shown in a perspective view with top and front covers of the enclosure 116 removed. As shown, embodiments of the present invention can provide for densely packaged physical storage devices 124. In particular, where each storage device sled 128 has m physical storage devices 124 attached to it, and there are n storage device sleds 128, the total number of storage devices is n×m in the enclosure 116. In the example shown in FIG. 2, there are 24 storage device sleds 128 (i.e., m=24), and each storage device sled 128 has two interconnected physical storage devices 124 (i.e., n=2). Accordingly, the example data storage system 104 shown in FIG. 2 includes 48 physical storage devices 124.

In accordance with embodiments of the present invention, each storage device sled 128 and its associated physical storage devices 124 can be removed by releasing fasteners 204 and sliding the storage device sled 128 and attached physical storage devices 124 out of the enclosure 116. Accordingly, each virtual storage device 120, comprising a storage device sled 128 and its attached physical storage devices 124, comprises a single field replaceable unit.

Continuing the example shown in FIG. 2, power supplies 136 and cooling units 140 are mounted towards the rear of the enclosure 116. Furthermore, space between the power supplies 136 and cooling units 140 is provided for a controller 132 or other componentry.

Figure 3:
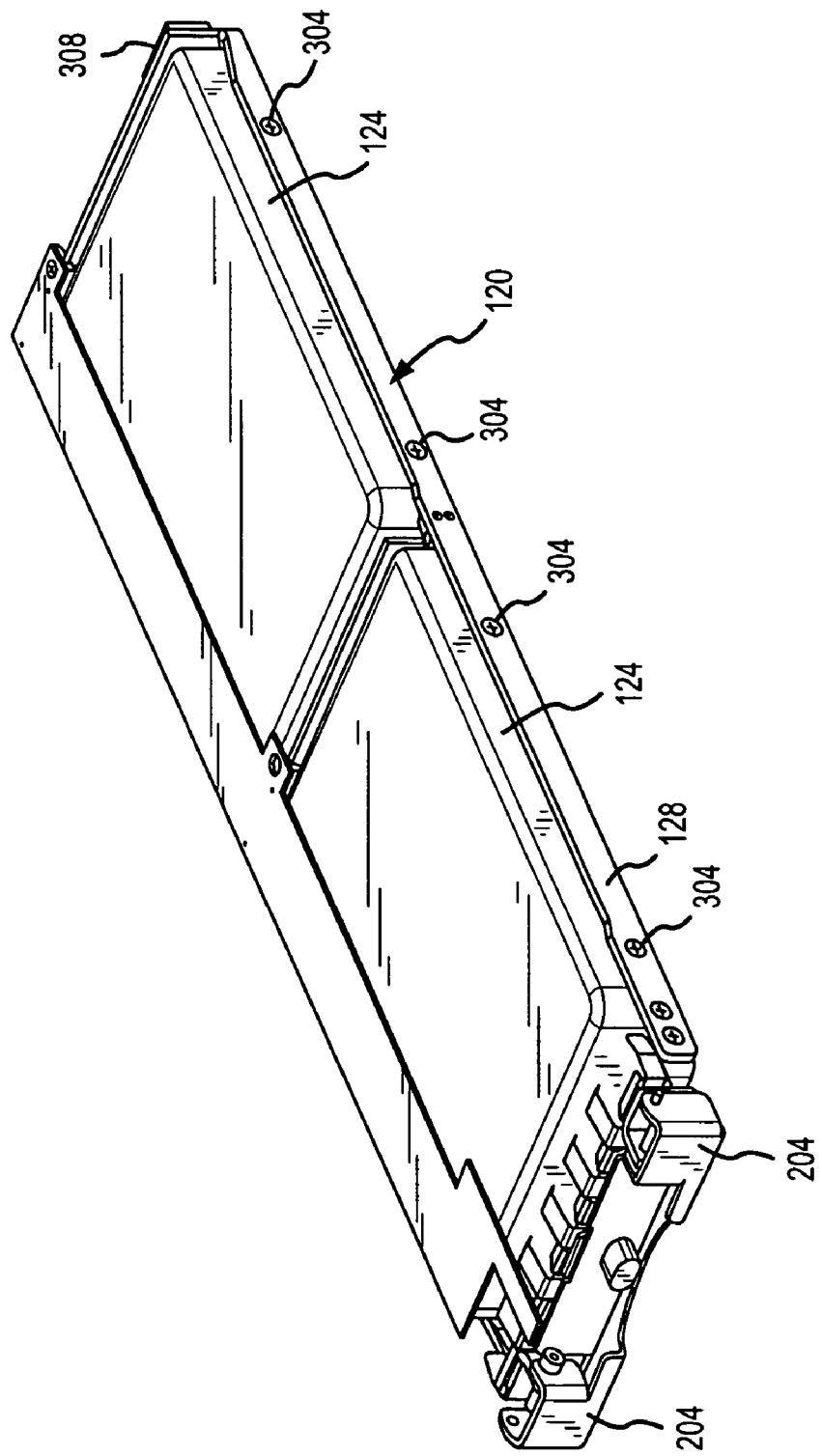
FIG. 3 is a perspective view of an exemplary field replaceable storage unit in accordance with embodiments of the present invention.

With reference now to FIG. 3, a single virtual storage device unit 120 having two physical storage devices 124 is illustrated. As seen in FIG. 3, the physical storage devices 124 are interconnected to the storage device sled 128 by storage device fasteners 304. In addition, the embodiment illustrated in FIG. 3 incorporates fasteners 204 for securing the virtual storage device unit 120 in an enclosure 116 that are incorporated into the storage device sled 128. The example virtual storage device unit 120 of FIG. 3 also includes a power and signal interface 308 to connect the virtual storage device 120 field replaceable unit to the bus or network 112, either directly or through a controller 132 or other components when the virtual storage device unit 120 is operatively connected to the remainder of data storage system 104.

Figure 4:
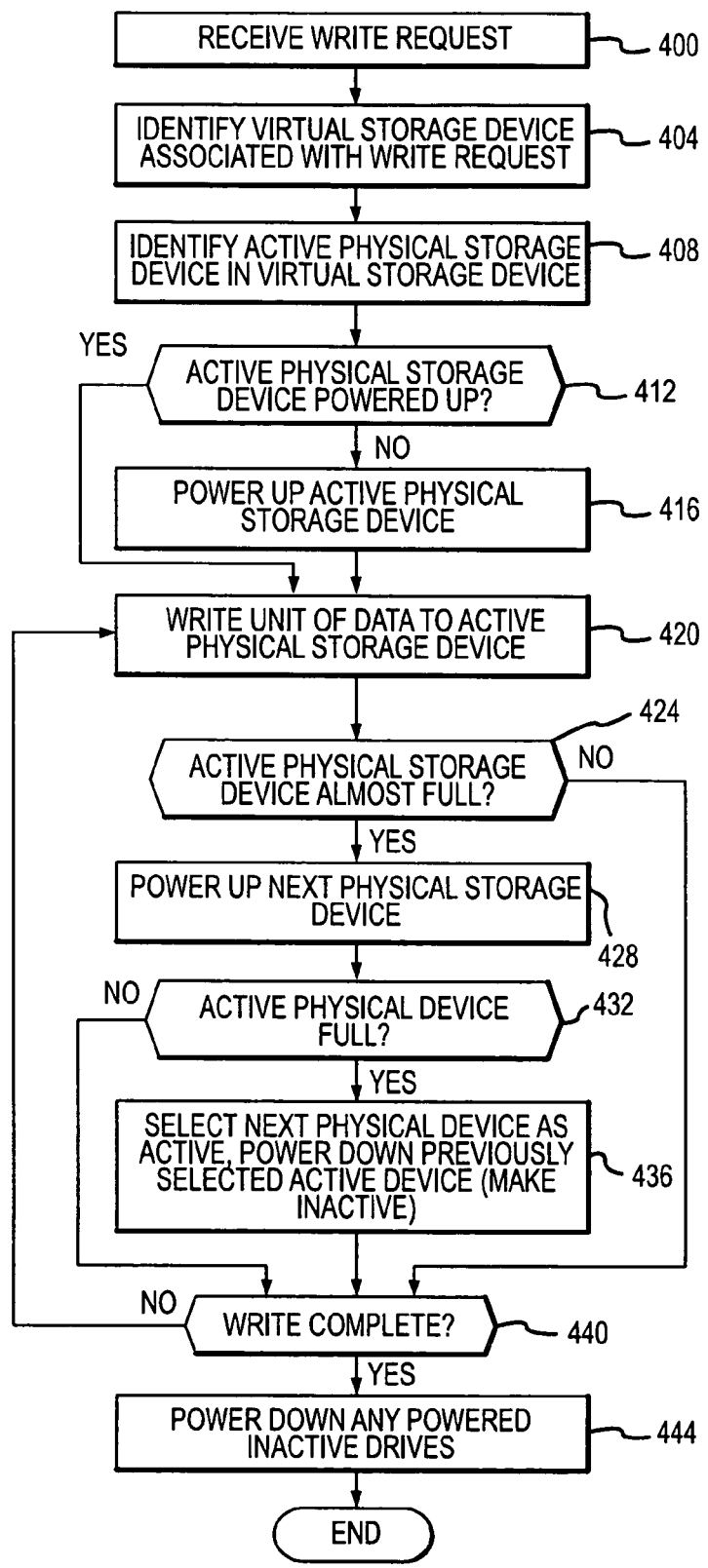
FIG. 4 is a flowchart illustrating aspects of a write operation in accordance with embodiments of the present invention.

With reference now to FIG. 4, aspects of the operation of a data storage system 104 in connection with a write operation are illustrated. Initially, at step 400, a write request is received by the data storage system 104. The virtual storage device 120 associated with the write request is then identified (step 404). Identifying or determining the virtual storage device 120 associated with a write request can comprise receiving an indication that the data associated with the write request is to be stored in a specified virtual storage device, for example a virtual storage device that has been assigned a drive letter. As a further example, identifying the virtual storage device 120 associated with a write request can comprise determining which "drive" within an array or collection of multiple drives the data should be stored in. Accordingly, the identity of a virtual drive 120 may be determined by implementation of a RAID scheme or other arrangement that provides rules for the distribution of data among units of a data storage system 104 comprising virtual storage units 120. Accordingly, the identification of a virtual storage device 120 associated with a write request can be made by a controller 132 associated with the data storage system 104, by an external controller, or by some other authority outside of the data storage system 104.

The active physical storage device 124 within the determined virtual storage device 120 is then identified or determined (step 408). In general, the active physical storage device 124 is the physical storage device 124 within the selected virtual storage device 120 to which data is actively being written. For example, where the data stored by a virtual storage device 120 is distributed across the physical storage devices 124 by concatenating the physical storage devices 124 together, a first one of the storage devices 124 is used to store data, until that first physical storage device 124 is full. After the first physical storage device 124 is full, data is stored on a next physical storage device 124, and so on. Therefore, the active physical storage device 124 is typically the last physical storage device 124 to which data was written.

A determination is then made as to whether the active physical storage device 124 is powered up (step 412). In accordance with embodiments of the present invention, the active physical storage device 124 is typically maintained in a powered up state, so that it is ready to receive data. As can be appreciated by one of skill in the art, a physical storage device 124 comprising a hard disk drive requires a period of time to spin up the data storage disks if it has been powered down. Therefore, by providing power to the active physical storage device 124, the delay that would otherwise be introduced as a result of needing to spin up the data storage disk is avoided. However, the active physical storage device 124 may nonetheless have been powered down, for example as part of a power conserving scheme, or when the virtual storage unit 120 containing the physical storage device 124, or the data storage system 104 itself, is being returned to service after having been offline. If it is determined that the active physical storage device 124 is not powered up, it is powered up at step 416. After powering up the physical storage device 124, or after determining that the active physical storage device 124 is powered up, a unit of data is written to the active physical storage device 124 (step 420).

At step 424, a determination is made as to whether the active physical storage device 124 is almost full. Whether an active physical storage device 124 is almost full may be determined by comparing the amount of data stored on the active physical storage device 124 to a user set threshold amount. If it is determined that the active physical storage device 124 is almost full, the next physical storage device 124 may be powered up (step 428). By powering up the next active physical storage device 124 when the presently active physical storage device 124 is almost full, the next active physical storage device 124 can be made ready to receive data, thereby allowing the writing of data to the virtual storage device 120 to continue without introducing delay as a result of needing to wait for the next physical storage device 124 to power up.

At step 432, a determination is made as to whether the active physical storage device 124 is full. If the active physical storage device 124 is full, the next physical storage device 124 is selected as the active device, and the previously active physical storage device 124 is powered down (step 436). If it is determined at step 432 that the active physical storage device 124 is not full, or after selecting the next physical storage device 124 as active, a determination is made as to whether the write operation is complete (step 440). If the write operation is not complete, the process returns to step 420 and a next unit of data is written to the active physical storage device 124. If the write operation is determined to be complete, any powered up but inactive physical storage devices 124 may be powered down (step 444) and the process may end.

Accordingly, it can be appreciated that embodiments of the present invention allow inactive physical storage devices 124 of a virtual storage device 120 to be powered down, even while data is being stored on another physical storage device 124 of that virtual storage device unit 120. As a result, the amount of power consumed is reduced as compared to a system in which all of the physical storage devices 124 were continuously powered up. Furthermore, the powering down of inactive physical storage devices 124 is performed independently of any power conservation algorithms that may be in place. Furthermore, the powering down of inactive physical storage devices 124 according to such embodiments of the present invention can be performed without necessarily introducing delays in performing write operations caused by needing to power up a storage device. Furthermore, because of the reduced power consumption of the data storage system 104 that results from powering down inactive storage devices 124, the heat generated within the data storage system 104 enclosure 116 is reduced, reducing the demands on and requirements for any included cooling units 140. Accordingly, with respect to write operations, embodiments of the present invention allow data to be received and written without introducing delay, while enabling physical storage devices to be powered down.

Figure 5:
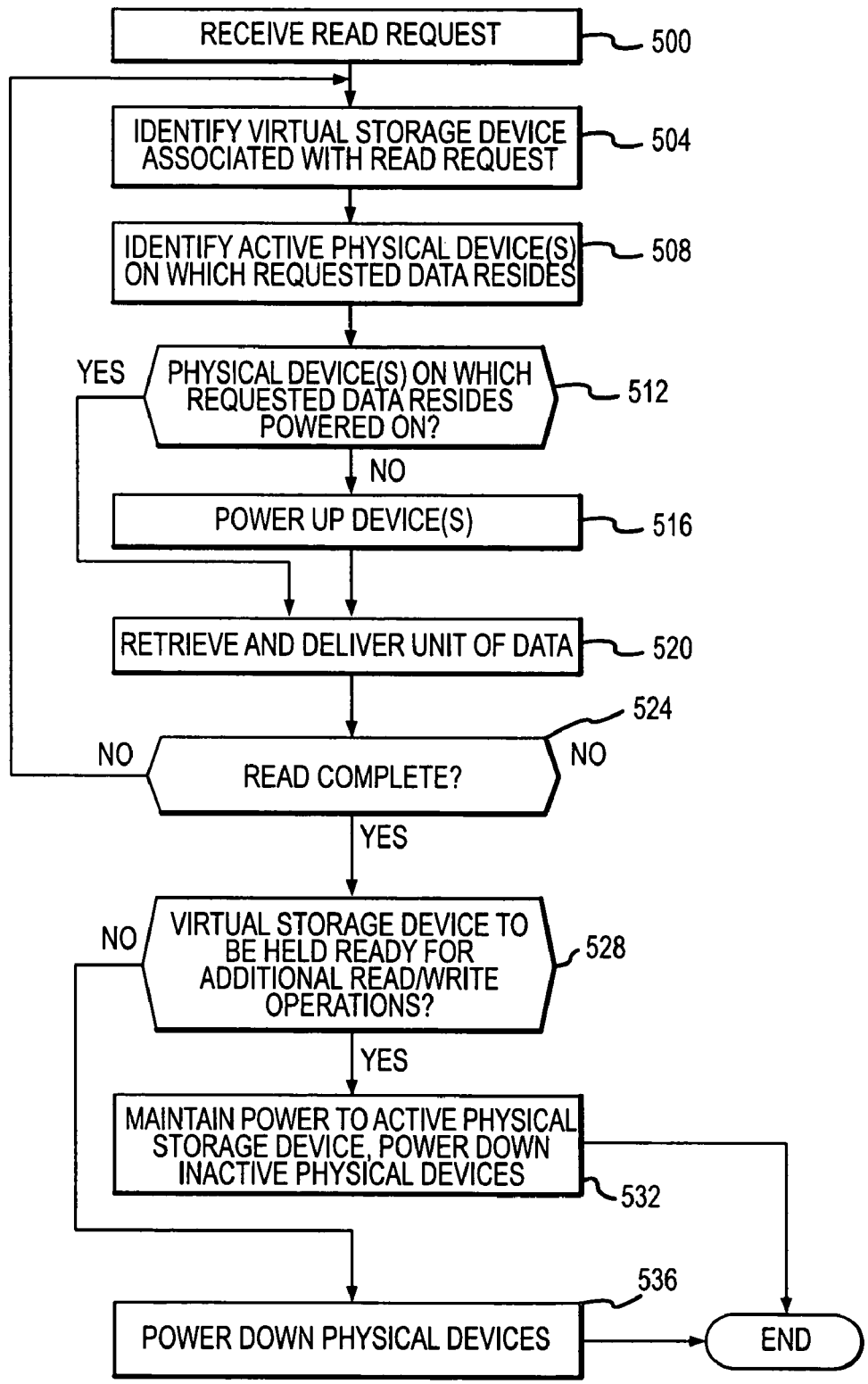
FIG. 5 is a flowchart illustrating aspects of a read operation in accordance with embodiments of the present invention.
Figure 6:
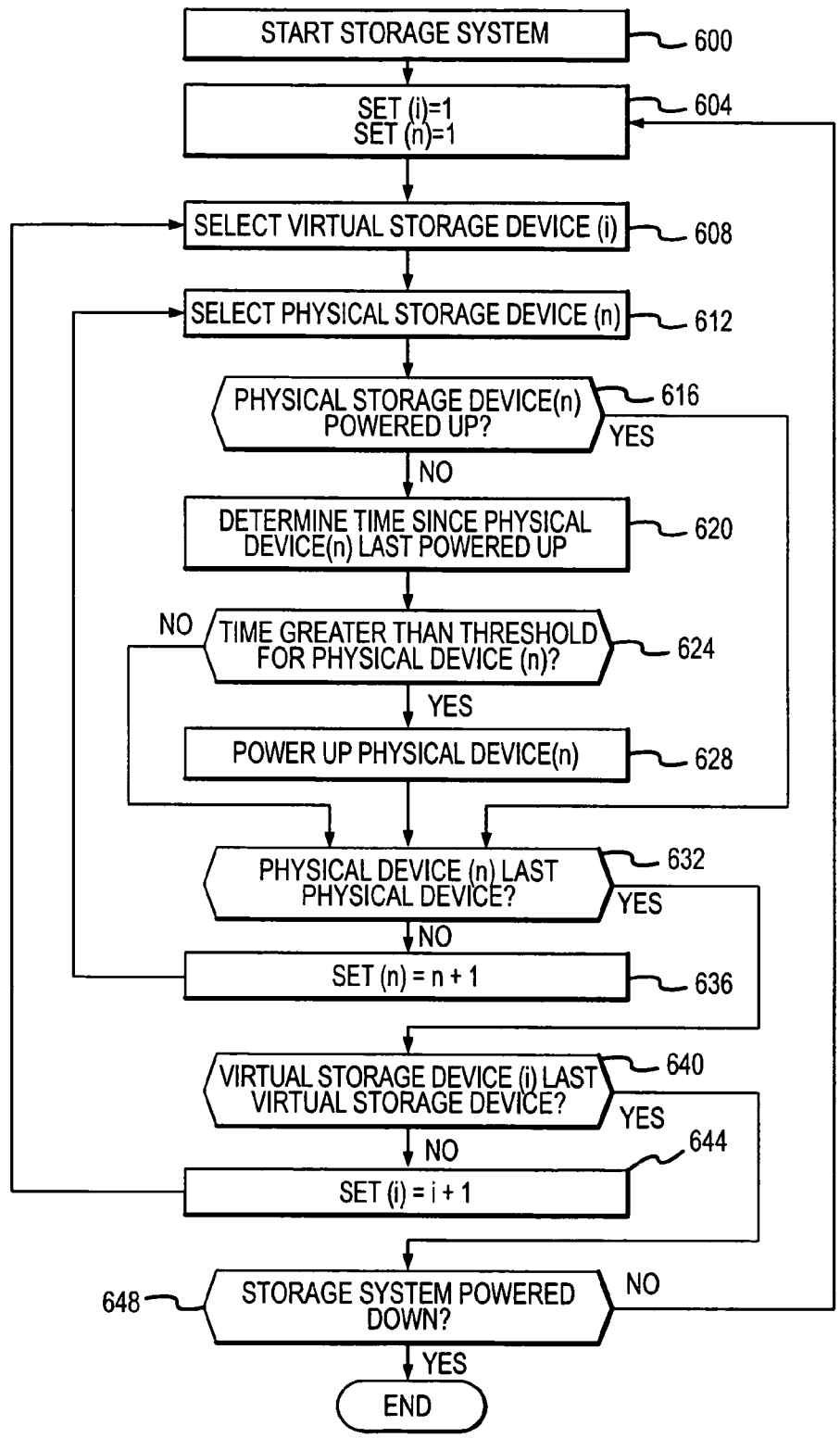
FIG. 6 is a flowchart illustrating the monitoring of powered down storage devices in accordance with embodiments of the present invention.

With reference now to FIG. 5, aspects of the operation of embodiments of the present invention in connection with read operations are illustrated. Initially, at step 500, a read request is received at the data storage system 104. The virtual storage device 120 associated with the read request is then identified or determined (step 504). As in the example where a write request is received, identifying the virtual storage device 120 associated with the read request may comprise receiving instructions from an operating system or higher level controller (i.e., above the data storage system 104 itself) as to the identity of the virtual storage device 120 containing the requested data. Alternatively, for example where a controller 132 associated with or included in the data storage system 104 acts such that the data storage system 104 appears as a single storage unit to outside systems and devices, the virtual storage device 120 containing the requested data may be determined by that controller 132. At step 508, the physical device or devices 124 on which the requested data resides is identified or determined. The identification of the physical storage device or devices 124 containing the requested data is generally made by a controller 132 included as part of the data storage system 104, either as a central controller 132 or as a controller 132 provided as part of the identified virtual storage device 120. Furthermore, the identification of a physical storage device 124 may include identifying a physical storage device 124 that is likely to contain data included in or associated with the received read request. For example, an algorithm implementing such aspects the operation of embodiments of the present invention may anticipate when the read operation will cross a physical storage device 124 boundary to a next physical storage device 124 included in a virtual storage device 120.

A determination is then made as to whether the identified physical storage device or devices 124 on which the requested data resides are powered on (step 512). If the physical device or devices are not powered on, that physical device or those devices are powered up at step 516. After powering up the physical storage device or devices 124 at step 516, or if the device or devices 124 are already powered on, a unit of data is retrieved and can be delivered across the bus or network 112 to the host 108 or other entity (step 520). Accordingly, it can be appreciated that the retrieval of data from a data storage system 104 in accordance with embodiments of the present invention may require that the requesting host 108 or other entity experience a period of delay, while a physical storage device 124 containing requested data is powered up. For example, a physical storage device 124 comprising a hard disk drive typically requires a number of seconds in order to bring its data storage disks up to operating speed. As a result, conventional data storage systems have avoided powering down storage devices. However, the inventors of the present invention have recognized that instantaneous access to requested data is not a requirement in all applications. For example, where a data storage system 104 comprising disk drive type physical storage devices 124 is for use in an application that may have been serviced by a tape based storage system in the past, access times may still be better than a solution using data storage tape. Furthermore, the power saving advantages, and the corresponding ability to limit the amount of heat generated within an enclosure 116, can outweigh the advantage of instantaneous access in many applications. In addition, by intelligently maintaining selected physical storage devices 124 in a powered up state, while allowing other physical storage devices 124 to be powered down, a data storage system 104 can deliver acceptable performance while maintaining the power saving and cool operating advantages of the present invention. Embodiments of the present invention that anticipate when an operation will (or likely will) cross a physical storage device 124 boundary can also operate to reduce access time by powering up the next physical storage device 124 before access to that physical storage device is actually required.

At step 524, a determination is made as to whether the read operation is complete. If the read operation is not complete, the process may return to step 508. In addition, it should be appreciated that the physical storage devices 124 on which data included in a read request is located can be identified after the read request has been received. That is, the identification of physical storage devices 124 containing the requested data can be made at one time, rather than for each block of data. With this information, any physical storage devices 124 that are powered down can be powered up so that they are ready to retrieve the requested data. Therefore, where no physical storage device 124 containing the requested data is powered up, the delay introduced by powering up the physical storage devices 124 can be limited to the time required to start up one of the physical storage devices 124, as the power up operation can be performed for all of the relevant physical storage devices 124 in parallel. Furthermore, where a first physical storage device 124 is powered up, any other relevant physical storage devices 124 can be powered up while data is retrieved from that first physical storage device 124, avoiding the introduction of additional delay due to needing to power up physical storage devices 124.

After the read operation is complete, a determination is made as to whether the identified virtual storage device 120 is to be held ready for additional read/write operations (step 528). If the virtual storage device 120 is to be held ready for additional operations, power may be maintained to the active physical storage device 124, while inactive physical storage devices 124 may be powered down. The active physical storage device 124 may comprise the physical storage device 124 that was last accessed in connection with the read operation, and/or it may comprise the physical storage device 124 of the virtual storage device 120 that is assigned to receive new data in connection with write operations. As can be appreciated by one of skill in the art, the identification and selection of an active physical storage device 124 with respect to maintaining the virtual storage device 120 in a ready state can depend on whether a read operation or a write operation is anticipated as the next operation that will be received, whether a read operation or a write operation is to be favored, or any other performance criteria that a user or operator may select, that may be selected as a default state, or that may be selected based on the history of recent operations involving the data storage device 104. If the virtual storage device 120 is to be held in a ready state, power may be maintained to the physical storage device 124 selected as the active physical storage device 124, and any remaining or inactive physical storage devices 124 may be powered down (step 532). If the virtual storage device 120 is not to be held ready for additional operations, all of the physical storage devices 124 may be powered down (step 536).

As can be appreciated by one of skill in the art, physical storage devices 124 may require periodic "exercising" in order to maintain full operational capabilities. For example, hard disk drives may need to be spun up periodically in order to prevent transducer heads from becoming adhered to associated storage disks. Accordingly, embodiments of the present invention may provide for the periodic exercising of physical storage devices 124 that have been powered down as part of the operating processes of a data storage system 104. The exercising of physical storage devices 124 may be implemented as a background task or daemon. According to such embodiments, when the data storage system 104 is powered up (step 600), count values i and n are set equal to 1 (step 604). A virtual storage device (i) 120 is then selected from among the virtual storage devices 120 included in the data storage system 104 (step 608). At step 612, a physical storage device (n) 124 included in the selected virtual storage device (i) 120 is selected.

At step 616, a determination is made as to whether the selected physical storage device (n) 124 is powered up. If the physical storage device (n) 124 is not powered up, the time since that physical storage device (n) 124 was last powered up is determined (step 620). This determination may comprise accessing a timer value maintained with respect to the selected physical storage device 124, indicating the time since that physical storage device 124 was last powered up. At step 624, a determination is made as to whether the time since the selected physical storage device (n) 124 was last powered up exceeds a threshold time for that device 124. The threshold time may be determined with reference to manufacturer recommendations regarding the exercising of the particular physical storage device 124. If the time that has elapsed since the physical storage device (n) 124 was last powered up exceeds the threshold time, that storage device (n) 124 is powered up at step 628 for a period of time. Manufacturer specifications may again be referenced in determining the minimum amount of time that the physical storage device 124 should be powered up. After the physical storage device has been powered up, or after determining that the threshold time period for exercising that physical storage device (n) 124 has not been exceeded, a determination is made as to whether the physical storage device (n) 124 is the last physical storage device in the selected virtual storage device (i) 120 (step 632). If the physical storage device (n) is not the last physical storage device, n is set equal to n+1 (step 636) and the process may return to step 612.

It is determined that the physical storage device (n) is the last physical storage device at step 632, a determination is then made as to whether the virtual storage device (i) 120 is the last virtual storage device 120 in the data storage system 104 (step 640). If the virtual storage device (i) 120 is not the last virtual storage device 120 included in the data storage system 104, i is set equal to i+1 (step 644) and the process returns to step 608. If the virtual storage device (i) 120 is the last virtual storage device 120, a determination may next be made as to whether the data storage system 104 has been powered down (step 648). If the data storage system 104 has not been powered down, the process may return to step 604. If the data storage system 104 has been powered down, the process may end.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with the various modifications required by their particular application or use of the invention. It is intended that the appended claims be construed to include alternative embodiments to the extent permitted by the prior art.

What is claimed is:

1. A data storage system, comprising:
   a plurality of virtual storage device units, each including:
     a storage device sled;
     a plurality of physical storage devices interconnected to said storage device sled, wherein no virtual storage device includes physical storage devices interconnected to different ones of said storage device sleds;
     a controller;
   a system enclosure, wherein said plurality of virtual storage device units are housed within said system enclosure, wherein any one virtual storage device unit can be removed from said system enclosure as a single field replaceable unit, wherein for each virtual storage device unit including more than one physical storage device said controller concatenates data on said plurality of physical storage devices, wherein each virtual storage device unit effectively operates as if it were comprised of a single physical storage device, wherein a first physical storage device in a first virtual storage device unit provides a first range of storage addresses, wherein a second physical storage device in said first virtual storage device unit provides a second range of storage addresses, and wherein data is not stored in said second range of storage addresses until data has been written to all storage addresses included in said first range of storage addresses;
   a power supply,
     wherein in a first mode of operation while storing data to said first virtual storage device unit, power is supplied to said first physical storage device and not to said second physical storage device while a first number of addresses included in said first range of addresses are not full of data,
     wherein in a second mode of operation after said first number of addresses included in said first range of addresses are full of data but before all of said first range of storage addresses are full of data, while power continues to be supplied to said first physical storage device and while storing data to said first virtual storage device unit, power is supplied to said second physical storage device,
     wherein said first number of storage addresses is less than all of said storage addresses included in said first range of storage addresses, and
     wherein in a third mode of operation after all of said storage addresses included in said first range of storage addresses are full of data and while storing data to said first virtual storage device unit, power is supplied to said second physical storage device and not to said first physical storage device.

2. The system of claim 1, wherein at least a first portion of data associated with said first virtual storage device unit is stored on said first physical storage device interconnected to a first storage device sled, and wherein at least a second portion of said data associated with said first virtual storage device unit is stored on said second physical storage device interconnected to said first storage device sled.

3. The system of claim 1, wherein information including a storage topology of said system is maintained in said controller.

4. The system of claim 3, wherein said controller apportions data between said virtual storage device units and between physical storage devices included in such virtual storage device units.

5. The system of claim 1, further comprising:
   a Redundant Array of Independent/Inexpensive Disks (RAID) controller, wherein each virtual storage device unit included in said plurality of virtual storage device units comprises an individual RAID drive of a RAID system, wherein said RAID controller selects from among said virtual storage devices as part of implementing a RAID array, and wherein a plurality of said RAID drives of said RAID system comprise virtual storage devices having a plurality of physical storage devices.

6. The system of claim 1, wherein in said first and third modes of operation a total number of physical storage devices powered on is equal to a number of virtual storage device units included in said plurality of virtual storage device units.

7. The system of claim 1, wherein during at least a portion of a read operation or a write operation associated with a one of said virtual storage device units, at least one of said plurality of physical storage devices included in said one virtual storage device unit is powered down.

8. The system of claim 1, wherein said first physical storage device comprises a device that contains data to be read from said first virtual storage device unit or that is the target for data to be written to said first virtual storage device unit.

9. The system of claim 1, wherein each virtual storage device unit is suitable for inclusion in a Redundant Array of Independent/Inexpensive Disks (RAID) array as a single logical storage unit or drive.

10. The system of claim 1, wherein each virtual storage device unit comprises a field replaceable unit, and wherein removal of one of said sleds removes only a single virtual storage device unit from said system.

11. The system of claim 1, wherein for at least one of said virtual storage device units, at least two of said plurality of physical storage devices are disposed along a common plane defined by said corresponding storage device sled.

12. The system of claim 1, wherein for each of said virtual storage device units all of said plurality of physical storage devices are disposed along a common plane defined by a mounting surface of said corresponding storage device sled.

13. The system of claim 1, wherein said first number of addresses is selected by a user.

14. A method for storing data in a storage system having a number of virtual storage devices, said number of virtual storage devices including at least first and second virtual storage devices, comprising:
   storing first data in said first virtual storage device including at least a first physical storage device interconnected to a second physical storage device by a first storage device sled, wherein said first and second physical storage devices are mounted to said first storage device sled, wherein at least a first portion of said first data is stored on said first physical storage device within a first contiguous range of addresses and at least a second portion of said first data is stored on said second physical storage device within a second contiguous range of addresses, wherein data in said first and second physical storage devices are concatenated, and wherein said first and second physical storage devices of said first virtual storage device and said first storage device sled are housed in an enclosure during normal operation of said storage system;

storing second data in said second virtual storage device including at least a third physical storage device, wherein said third physical storage device of said second virtual storage device is housed in said enclosure during normal operation of said storage system;

determining that less than a threshold amount of data is stored on said first physical storage device of said first virtual storage device;

while less than said threshold amount of data is stored on said first physical storage device of said first virtual storage device, and during write operations to store said first data in said first virtual storage device, supplying power to said first physical storage device of said first virtual storage device and not to said second physical storage device of said first virtual storage device, wherein said threshold amount of data occupies less than all of said addresses in said first contiguous range of addresses:

determining that more than said threshold amount of data is stored on said first physical storage device of said first virtual storage device but that less than all addresses included in said first contiguous range of addresses on said first physical storage device of said first virtual storage device are full of data;

while more than said threshold amount of data is stored on said first physical storage device of said first virtual storage device but less than all addresses included in said first contiguous range of addresses on said first physical storage device of said first virtual storage device are full of data and during write operations to store data in said first virtual storage device, supplying power to said first physical storage device of said first virtual storage device and supplying power to said second physical storage device of said first virtual storage device;

determining that all addresses included in said first contiguous range of addresses on said first physical storage device are full of data;

while all addresses included in said first contiguous range of addresses on said first physical storage device of said first virtual storage device are full of data and during write operations to store data in said first virtual storage device, supplying power to said second physical storage device of said first virtual storage device and not to said first physical storage device of said first virtual storage device; and removing said first and second physical storage devices of said first virtual storage device from said enclosure, wherein said first and second physical storage devices are removed as a single unit, wherein removing said first and second physical storage devices comprises removing said first virtual storage device, a component interconnecting said first and second physical storage devices, and any physical storage devices included in said first virtual storage device in addition to said first and second physical storage devices, and wherein removal of said at least first and second physical storage devices does not remove any portion of a virtual storage device other than said first virtual storage device.

15. The method of claim 14, wherein said removing said first and second physical storage devices from said enclosure is performed in response to detecting a fault in one of said first and second physical storage devices.

16. The method of claim 14, further comprising:
receiving data to write to said first virtual storage device;
writing a first portion of said received data to said first physical storage device of said first virtual storage device; and
writing a second portion of said received data to said second physical storage device of said first virtual storage device.

17. The method of claim 14, wherein said first and second virtual storage devices effectively comprise first and second disks respectively of a RAID Redundant Array of Independent/Inexpensive Disks (RAID).

18. The method of claim 17, further comprising:
inserting a replacement for said first virtual storage device as a unit including at least replacement first and second physical storage devices and a storage device sled; and
rebuilding said RAID array, wherein said rebuilding comprises copying redundant data from at least said second virtual storage device to said replacement first virtual storage device.

19. A data storage system, comprising:
a plurality of virtual storage device unit means, each including;
a plurality of means for storing data; and
means for interconnecting said plurality of means for storing data, wherein said plurality of means for storing data are mounted to said means for interconnecting;
means for supplying power to said plurality of means for storing data;
means for controlling a distribution of data across said plurality of means for storing data,
wherein during a write operation data associated with a first one of said plurality of virtual storage device units is stored in and power is supplied to a first one of said plurality of means for storing data mounted to a first one of said means for interconnecting and power is not supplied to a second one of said plurality of means for storing data mounted to said first one of said means for interconnecting until said first one of said plurality of means for storing data is almost full,
wherein said first one of said plurality of means for storing data is almost full when a threshold amount of the data storage available on said first one of said plurality of means for storing data contains data,
wherein after said first one of said plurality of means for storing data is almost full, during said write operation data associated with said first one of said plurality of virtual storage device units are stored in and power is supplied to said first one of said plurality of means for storing data mounted to said first one of said means for interconnecting and power is also supplied to said second one of said plurality of means for storing data connected to said first one of said means for interconnecting;

wherein after said first one of said plurality of means for storing data is full power is no longer supplied to said first one of said plurality of means for storing data during said write operation, power is supplied to said second one of said plurality of means for storing data, and data is stored in said second one of said plurality of means for storing data; and means for enclosing said plurality of means for storing data and said means for supplying power, wherein any one of said plurality of virtual storage device unit means is removable from said means for enclosing as a single field replaceable unit.

20. The system of claim 19, wherein operational power is not supplied to said second one of said virtual storage devices until said first virtual storage device unit is full or contains a predetermined amount of data.

21. The system of claim 19, wherein at least two of said means for storing data are disposed along a common plane defined by said means for interconnecting.

* * * * *